US00RE45727E

(19) United States
(12) Reissued Patent
Park et al.

(10) Patent Number: US RE45,727 E
(45) Date of Reissued Patent: Oct. 6, 2015

(54) METHOD AND APPARATUS FOR MANUFACTURING LIQUID CRYSTAL DISPLAY DEVICE USING SERIAL PRODUCTION PROCESSES

(71) Applicant: LG DISPLAY CO., LTD., Seoul (KR)

(72) Inventors: Sang Ho Park, Pusan-kwangyokshi (KR); Sang Seok Lee, Taegu-kwangyokshi (KR)

(73) Assignee: LG DISPLAY CO., LTD., Seoul (KR)

(21) Appl. No.: 13/912,046

(22) Filed: Jun. 6, 2013

Related U.S. Patent Documents

Reissue of:
(64) Patent No.: 6,803,984
Issued: Oct. 12, 2004
Appl. No.: 10/128,452
Filed: Apr. 24, 2002

(30) Foreign Application Priority Data

Feb. 25, 2002 (KR) ..... P2002-9961

(51) Int. Cl.
*G02F 1/133* (2006.01)
*G02F 1/1339* (2006.01)
*G02F 1/1341* (2006.01)
*G02F 1/1335* (2006.01)

(52) U.S. Cl.
CPC ..... *G02F 1/1341* (2013.01); *G02F 1/133514* (2013.01)

(58) Field of Classification Search
CPC ..... G02F 2001/133354
USPC ..... 349/187, 190
See application file for complete search history.

(56) References Cited

U.S. PATENT DOCUMENTS

| | | | | |
|---|---|---|---|---|
| 3,978,580 | A | 9/1976 | Leupp et al. | 29/886 |
| 4,094,058 | A | 6/1978 | Yasutake et al. | 29/592 R |
| 4,653,864 | A | 3/1987 | Baron et al. | 349/156 |
| 4,691,995 | A | 9/1987 | Yamazaki et al. | 350/331 R |
| 4,775,225 | A | 10/1988 | Tsuboyama et al. | 349/155 |
| 5,247,377 | A | 9/1993 | Omeis et al. | 359/76 |

(Continued)

FOREIGN PATENT DOCUMENTS

| | | |
|---|---|---|
| EP | 1 003 066 A1 | 5/2000 |
| JP | 51-065656 | 6/1976 |

(Continued)

*Primary Examiner* — Deandra Hughes
(74) *Attorney, Agent, or Firm* — Morgan, Lewis & Bockius LLP

(57) ABSTRACT

A method and apparatus are provided for manufacturing a liquid crystal display device. The method includes the steps of providing at least a first substrate and a second substrate on a single production process line, passing the first and second substrates through a sealing material coating portion of the single production process line in serial order such that a sealing material is coated on the second substrate with the first substrate being passed through the sealing material coating portion without forming a sealing material thereon, passing the first and the second substrates through a liquid crystal dispensing portion of the single production process line in serial order such that liquid crystal is dispensed onto a pixel region of one of the first and second substrates with the other one of the first and second substrates being passed through the liquid crystal dispensing portion without dispensing liquid crystal thereon, and assembling the first substrate with the second substrate to form a liquid crystal panel of at least one liquid crystal display device.

31 Claims, 4 Drawing Sheets

(56) References Cited

U.S. PATENT DOCUMENTS

| | | | | |
|---|---|---|---|---|
| 5,263,888 | A | 11/1993 | Ishihara et al. | 445/25 |
| 5,379,139 | A | 1/1995 | Sato et al. | 349/155 |
| 5,406,989 | A | 4/1995 | Abe | 141/7 |
| 5,499,128 | A | 3/1996 | Hasegawa et al. | 349/155 |
| 5,507,323 | A | 4/1996 | Abe | 141/31 |
| 5,511,591 | A | 4/1996 | Abe | 141/7 |
| 5,539,545 | A | 7/1996 | Shimizu et al. | 349/86 |
| 5,548,429 | A | 8/1996 | Tsujita | 349/187 |
| 5,642,214 | A | 6/1997 | Ishii et al. | 349/96 |
| 5,680,189 | A | 10/1997 | Shimizu et al. | 349/123 |
| 5,742,370 | A | 4/1998 | Kim et al. | 349/124 |
| 5,757,451 | A | 5/1998 | Miyazaki et al. | 349/106 |
| 5,852,484 | A | 12/1998 | Inoue et al. | 349/86 |
| 5,854,664 | A | 12/1998 | Inoue et al. | 349/92 |
| 5,861,932 | A | 1/1999 | Inata et al. | 349/156 |
| 5,875,922 | A | 3/1999 | Chastine et al. | 222/1 |
| 5,943,113 | A * | 8/1999 | Ichihashi | 349/187 |
| 5,952,676 | A | 9/1999 | Sato et al. | 257/59 |
| 5,956,112 | A | 9/1999 | Fujimori et al. | 346/156 |
| 6,001,203 | A | 12/1999 | Yamada et al. | 156/106 |
| 6,011,609 | A | 1/2000 | Kato et al. | 349/190 |
| 6,016,178 | A | 1/2000 | Kataoka et al. | 349/117 |
| 6,016,181 | A | 1/2000 | Shimada | 349/156 |
| 6,055,035 | A | 4/2000 | Von Gutfeld et al. | 349/187 |
| 6,163,357 | A | 12/2000 | Nakamura | 349/155 |
| 6,219,126 | B1 | 4/2001 | Von Gutfeld | 349/153 |
| 6,226,067 | B1 | 5/2001 | Nishiguchi et al. | 349/155 |
| 6,236,445 | B1 | 5/2001 | Foschaar et al. | 349/156 |
| 6,304,306 | B1 | 10/2001 | Shiomi et al. | 349/88 |
| 6,304,311 | B1 | 10/2001 | Egami et al. | 349/189 |
| 6,337,730 | B1 | 1/2002 | Ozaki et al. | 349/156 |
| 6,414,733 | B1 | 7/2002 | Ishikawa et al. | 349/110 |
| 6,573,972 | B2 * | 6/2003 | Sasaki | 349/190 |
| 6,618,112 | B1 * | 9/2003 | Yoshimura et al. | 349/155 |
| 6,646,689 | B2 * | 11/2003 | Matsuda | 349/1 |
| 2001/0002858 | A1 * | 6/2001 | Kageyama et al. | 349/158 |
| 2001/0021000 | A1 | 9/2001 | Egami | 349/187 |
| 2002/0063845 | A1 * | 5/2002 | Lim | 349/189 |

FOREIGN PATENT DOCUMENTS

| | | | | |
|---|---|---|---|---|
| JP | 57-38414 | | 3/1982 | |
| JP | 57-88428 | | 6/1982 | |
| JP | 58-27126 | | 2/1983 | |
| JP | 59-057221 | | 4/1984 | |
| JP | 59-195222 | | 11/1984 | |
| JP | 60-111221 | | 6/1985 | |
| JP | 60-164723 | | 8/1985 | |
| JP | 60-217343 | | 10/1985 | |
| JP | 61-7822 | | 1/1986 | |
| JP | 61-55625 | | 3/1986 | |
| JP | 62-89025 | | 4/1987 | |
| JP | 62-90622 | | 4/1987 | |
| JP | 62-205319 | | 9/1987 | |
| JP | 63-109413 | | 5/1988 | |
| JP | 63-110425 | | 5/1988 | |
| JP | 63-128315 | | 5/1988 | |
| JP | 63-311233 | | 12/1988 | |
| JP | 5-127179 | | 5/1993 | |
| JP | 5-154923 | A | 6/1993 | |
| JP | 5-265011 | | 10/1993 | |
| JP | 5-281557 | | 10/1993 | |
| JP | 5-281562 | | 10/1993 | |
| JP | 6-51256 | | 2/1994 | |
| JP | 6-148657 | | 5/1994 | |
| JP | 6-160871 | | 6/1994 | |
| JP | 6-235925 | A | 8/1994 | |
| JP | 6-265915 | | 9/1994 | |
| JP | 6-313870 | A | 11/1994 | |
| JP | 7-84268 | A | 3/1995 | |
| JP | 7-128674 | | 5/1995 | |
| JP | 7-181507 | | 7/1995 | |
| JP | 8-95066 | | 4/1996 | |
| JP | 8-101398 | A | 4/1996 | |
| JP | 8-406101 | | 4/1996 | |
| JP | 08-171076 | A * | 7/1996 | |
| JP | 8-171094 | | 7/1996 | |
| JP | 8-190099 | | 7/1996 | |
| JP | 8-240807 | | 9/1996 | |
| JP | 9-5762 | | 1/1997 | |
| JP | 9-26578 | | 1/1997 | |
| JP | 9-61829 | A | 3/1997 | |
| JP | 9-73096 | | 3/1997 | |
| JP | 1997-68682 | * | 3/1997 | G02F 1/13 |
| JP | 9-127528 | | 5/1997 | |
| JP | 9-73075 | | 8/1997 | |
| JP | 9-230357 | | 9/1997 | |
| JP | 9-281511 | | 10/1997 | |
| JP | 9-311340 | | 12/1997 | |
| JP | 10-123537 | | 5/1998 | |
| JP | 10-123538 | | 5/1998 | |
| JP | 10-142616 | | 5/1998 | |
| JP | 10-177178 | A | 6/1998 | |
| JP | 10-221700 | | 8/1998 | |
| JP | 10-282512 | | 10/1998 | |
| JP | 10-333157 | A | 12/1998 | |
| JP | 10-333159 | A | 12/1998 | |
| JP | 11-14953 | | 1/1999 | |
| JP | 11-38424 | | 2/1999 | |
| JP | 11-64811 | | 3/1999 | |
| JP | 11-109888 | | 4/1999 | |
| JP | 11-133438 | A | 5/1999 | |
| JP | 11-142864 | A | 5/1999 | |
| JP | 11-174477 | | 7/1999 | |
| JP | 11-212045 | | 8/1999 | |
| JP | 11-248930 | A | 9/1999 | |
| JP | 11-326922 | A | 11/1999 | |
| JP | 11-344714 | | 12/1999 | |
| JP | 2000-2879 | A | 1/2000 | |
| JP | 2000-29035 | | 1/2000 | |
| JP | 2000-56311 | A | 2/2000 | |
| JP | 2000-66165 | A | 3/2000 | |
| JP | 2000-137235 | A | 5/2000 | |
| JP | 2000-147528 | A | 5/2000 | |
| JP | 2000-193988 | A | 7/2000 | |
| JP | 2000-241824 | A | 9/2000 | |
| JP | 2000-284295 | A | 10/2000 | |
| JP | 2000-292799 | A | 10/2000 | |
| JP | 2000-310759 | A | 11/2000 | |
| JP | 2000-310784 | A | 11/2000 | |
| JP | 2000-338501 | A | 12/2000 | |
| JP | 2001-5401 | A | 1/2001 | |
| JP | 2001-5405 | A | 1/2001 | |
| JP | 2001-13506 | A | 1/2001 | |
| JP | 2001-33793 | A | 2/2001 | |
| JP | 2001-42341 | A | 2/2001 | |
| JP | 2001-51284 | A | 2/2001 | |
| JP | 2001-66615 | A | 3/2001 | |
| JP | 2001-91727 | A | 4/2001 | |
| JP | 2001-117105 | | 4/2001 | |
| JP | 2001-117109 | A | 4/2001 | |
| JP | 2001-133745 | A | 5/2001 | |
| JP | 2001-133794 | | 5/2001 | |
| JP | 2001-133799 | A | 5/2001 | |
| JP | 2001-142074 | | 5/2001 | |
| JP | 2001-147437 | | 5/2001 | |
| JP | 2001-154211 | | 6/2001 | |
| JP | 2001-166272 | A | 6/2001 | |
| JP | 2001-183683 | A | 6/2001 | |
| JP | 2001-166310 | A | 7/2001 | |
| JP | 2001-201750 | A | 7/2001 | |
| JP | 2001-209052 | A | 8/2001 | |
| JP | 2001-209060 | A | 8/2001 | |
| JP | 2001-215459 | A | 8/2001 | |
| JP | 2001-222017 | A | 8/2001 | |
| JP | 2001-235758 | A | 8/2001 | |
| JP | 2001-255542 | | 9/2001 | |
| JP | 2001-264782 | | 9/2001 | |
| JP | 2001-272640 | A | 10/2001 | |
| JP | 2001-281675 | A | 10/2001 | |
| JP | 2001-281678 | A | 10/2001 | |
| JP | 2001-282126 | A | 10/2001 | |
| JP | 2001-305563 | A | 10/2001 | |

(56) References Cited

FOREIGN PATENT DOCUMENTS

| | | | |
|---|---|---|---|
| JP | 2001-330837 | A | 11/2001 |
| JP | 2001-330840 | | 11/2001 |
| JP | 2001-356353 | A | 12/2001 |
| JP | 2001-356354 | | 12/2001 |
| JP | 2002-14360 | | 1/2002 |
| JP | 2002-23176 | | 1/2002 |
| JP | 2002-49045 | | 2/2002 |
| JP | 2002-82340 | | 3/2002 |
| JP | 2002-90759 | | 3/2002 |
| JP | 2002-90760 | | 3/2002 |
| JP | 2002-107740 | | 4/2002 |
| JP | 2002-122872 | | 4/2002 |
| JP | 2002-122873 | | 4/2002 |
| JP | 2002-139734 | | 5/2002 |
| JP | 2002-202512 | | 7/2002 |
| JP | 2002-202514 | | 7/2002 |
| JP | 2002-214626 | | 7/2002 |
| KR | 2000-0035302 | A | 6/2000 |

* cited by examiner

METHOD AND APPARATUS FOR MANUFACTURING LIQUID CRYSTAL DISPLAY DEVICE USING SERIAL PRODUCTION PROCESSES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit of the Korean Application No. P2002-9961 filed in Korea on Feb. 25, 2002, which is hereby incorporated by reference.

BACKGROUND OF THE INVENTION

1. Field of the Invention

The present invention relates to a method and apparatus for manufacturing a liquid crystal display device, and more particularly, to a method and apparatus for manufacturing a liquid crystal display device by using a liquid crystal dropping method.

2. Discussion of the Related Art

With rapid development of an information-oriented society, a need for an information display device having characteristics such as good image quality, light weight, small thickness, and low power consumption has correspondingly been increased. To meet this need, there has been much research directed toward various flat panel display device technologies, such as liquid crystal display device (LCD) technology, plasma display panel (PDP) technology, electro luminescent display (ELD) technology, vacuum fluorescent display (VFD) technology. Some of these display device technologies have already been applied in various applications as the information display device.

Of above various flat panel display devices, the LCD is currently the most widely used due to its ability to meet the above need. In fact, in portable devices such as notebook PC computers, LCD technology has replaced cathode ray tube (CRT) technology. Moreover, even in desktop type displays such as PC monitors and TV monitors, LCD technology has been developed and employed.

A liquid crystal cell includes two opposing substrates and a liquid crystal material filled between the substrates. Liquid crystal is a phase of material having intermediate properties between the liquid and the solid such as fluidity of liquids but long-range order of solids. The liquid crystal material, in an intermediate state between the liquid and the solid, has an optical anisotropy due to its long-range orientational order as well as mechanical fluidity. An LCD is manufactured through a number of processes such as an array process, a color filter process, a liquid crystal cell process, and a module process.

An array process is a process repeating a deposition, a photolithography, and an etching to form a thin film transistor (TFT) array on a first substrate (TFT substrate). A color filter process is a process for forming an ITO (Indium Tin Oxide) film for a common electrode, after red, green, and blue color filters (CF) of dyes or pigments are formed on a second substrate (CF substrate) having a black matrix formed thereon.

A liquid crystal cell process is a process of assembling the TFT substrate and the CF substrate prepared by the array process and the color filter process, respectively. Generally, an empty liquid crystal cell is formed with a fixed and thin gap between the first substrate and the second substrate. Then, the liquid crystal is filled through an opening around the gap to form a liquid crystal panel. A module process is a process for assembling a driving circuit part for processing input and output signals, connecting the liquid crystal panel to a signal processor, and assembling some frames, thereby completing the liquid crystal module.

The step of filling liquid crystal into the liquid crystal cell in the liquid crystal cell process step can be explained as follows.

In the liquid crystal filling step, a liquid crystal material is contained in a container disposed in a chamber. The chamber is maintained in a vacuum state for removing moisture and air dissolved in the liquid crystal material or contained inside the container. While maintaining the vacuum state of the chamber, a liquid crystal filling hole in the empty liquid crystal cell is dipped in the container, and brought into contact with the liquid crystal material. Then, the chamber is vented from a higher vacuum state to a lower vacuum state, and eventually to the atmospheric pressure state. Accordingly, the liquid crystal material is filled into the empty liquid crystal cell through the liquid crystal filling hole by a pressure difference between a pressure in the liquid crystal cell and a pressure in the chamber.

However, the above described liquid crystal filling method has poor productivity because the method needs long time for the liquid crystal filling. That is, before the liquid crystal material is filled into the liquid crystal cell, the large assembled panel must be cut into unit panels, a portion of the unit panel must be dipped into the container, and the liquid crystal filling hole must be brought into contact with the liquid crystal material while the chamber is kept at a vacuum state. Moreover, a large sized LCD is likely to have some defects coming from imperfect filling of the liquid crystal material into the cell.

With regard to this, a liquid crystal dropping method has been developed in which a fixed amount of the liquid crystal is dropped onto an inner surface of the TFT substrate in a corresponding area on the TFT substrate inside a main sealing area formed around the CF substrate (or, alternatively, TFT substrate). Then, the TFT substrate and the CF substrate are assembled into a large liquid crystal panel in a vacuum chamber. The liquid crystal cell process using the liquid crystal dropping method can be explained as follows.

Referring to FIG. 1, an orientation step (1S) in which an orientation material is coated on the TFT substrate and the CF substrate, and mechanical rubbing is carried out on the both substrates for having molecules of the liquid crystal material oriented, carried out. Then, the TFT substrate and the color filter substrate are cleaned (2S).

The TFT substrate includes a plurality of gate lines running in one direction at fixed intervals, and a plurality of data lines running in a direction perpendicular to the gate lines at fixed intervals. A plurality of thin film transistors and pixel electrodes are formed in a matrix pixel region defined by the gate lines and the data lines. The CF substrate includes a black matrix layer, a color filter, and a common electrode. Hence, the black matrix layer shields a light leakage of parts except the pixel region.

Then, the cleaned CF substrate is loaded onto a stage of a seal dispenser, and a sealing material is coated on a periphery of the panel (3S). The sealing material may be a photosensitive resin, or thermo-curing resin. Meanwhile, no filling hole or sealing structure for filling the cell with liquid crystal is required.

At the same time, the cleaned TFT substrate is loaded onto a stage of a silver (Ag) dispenser, and a silver paste material is dotted (i.e., dispensed) into a common voltage supply line of the TFT substrate (5S). Then, the TFT substrate is transferred to an LC dispenser, and liquid crystal material is dropped (i.e., dispensed) onto an active array region of each unit panel areas (6S). The liquid crystal dropping process is carried out as follows.

After a liquid crystal material is filled into an LC syringe before the LC syringe is assembled and set in the production line, moisture and air dissolved in the liquid crystal material is removed under a vacuum state (7S). Then, the liquid crystal syringe is assembled and set (8S), and mounted on the liquid crystal dispenser (9S). When the TFT substrate is loaded onto a stage of the liquid crystal dispenser, the liquid crystal material is dropped therefrom using the liquid crystal syringe (6S) by dotting a fixed amount of the liquid crystal material onto the TFT substrate at a predetermined pitch inside a coating area of the sealing material (i.e., the pixel region).

After the TFT substrate and the CF substrate are loaded into a vacuum assembling chamber, the TFT substrate and the CF substrate are assembled such that the dropped liquid crystal is uniformly spread over unit panel areas (10S). Then, the sealing material is cured (10S). The assembled TFT substrate and color filter substrate, that is, a large panel, is cut into individual unit panels (11S). Each unit panel is ground and inspected (12S), thereby completing the LCD unit panel.

However, the above method for manufacturing a liquid crystal display having the liquid crystal dropping method applied thereto has the following problems. In the above the liquid crystal cell process, after the orientation steps and the cleaning step, the formation step of silver dots, and the dispensing step of the liquid crystal material on the TFT substrate process, and the sealing material coating step on the CF substrate are carried out using two separate and parallel production lines until the vacuum assembling and curing step (10S). That is, two production lines are used so that the TFT substrate and the CF substrate respectively pass through the orientation step (1S), the cleaning step (2S), the sealing material coating step (3S), the silver dotting step (5S), and the liquid crystal dropping step (6S) in parallel production lines. The use of two production lines results in poor spatial efficiency, higher costs caused by two sets of expensive equipment, and efficiency losses due to different processing times between the two production lines (i.e., line unbalance). Moreover, an inoperative state of one production line caused by failure of the other line reduces productivity substantially.

SUMMARY OF THE INVENTION

Accordingly, the present invention is directed to a method and apparatus for manufacturing a liquid crystal display that substantially obviate one or more of the above problems due to limitations and disadvantages of the related art.

An object of the present invention is to provide a method and apparatus for manufacturing a liquid crystal display, which can maximize spatial efficiency, and improve productivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages in accordance with the purpose of the present invention, as embodied and broadly described, a method for manufacturing a liquid crystal display device comprises the steps of providing at least a first substrate and a second substrate on a single production process line; passing the first and second substrates through a sealing material coating portion of the single production process line in serial order, a sealing material being coated on the second substrate with the first substrate being passed through the sealing material coating portion without forming a sealing material thereon; passing the first and the second substrates through a liquid crystal dispensing portion of the single production process line in serial order, liquid crystal being dispensed onto a pixel region of one of the first and second substrates with the other one of the first and second substrates being passed through the liquid crystal dispensing portion without dispensing liquid crystal thereon; and assembling the first substrate with the second substrate to form a liquid crystal panel of at least one liquid crystal display device.

In another aspect, an apparatus for manufacturing a liquid crystal display device having first and second substrates comprises a sealing coating portion disposed to receive the first and second substrates in serial order, the sealing coating portion forming a sealing material on the second substrate and passing the first substrate without forming a sealing material thereon; a liquid crystal dispensing portion in series with the sealing coating portion to receive the first and second substrates in serial order, the liquid crystal dispensing portion dispensing liquid crystal onto one of the first and second substrates and passing the other one of the first and second substrates without dispensing liquid crystal thereon; and an assembler operatively disposed after the sealing coating portion and the liquid crystal dispensing portion, the assembler receiving the first and second substrate and assembling the first substrate with the second substrate to form a liquid crystal panel of a liquid crystal display device.

In another aspect, an apparatus for manufacturing a liquid crystal display device comprises means for providing at least a first substrate and a second substrate on a single production process line; means for passing the first and second substrates through a sealing material coating portion of the single production process line in serial order, a sealing material being coated on the second substrate with the first substrate being passed through the sealing material coating portion without forming a sealing material thereon; means for passing the first and the second substrates through a liquid crystal dispensing portion of the single production process line in serial order, liquid crystal being dispensed onto a pixel region of one of the first and second substrates with the other one of the first and second substrates being passed through the liquid crystal dispensing portion without dispensing liquid crystal thereon; and means for assembling the first substrate with the second substrate to form a liquid crystal panel of a liquid crystal display device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
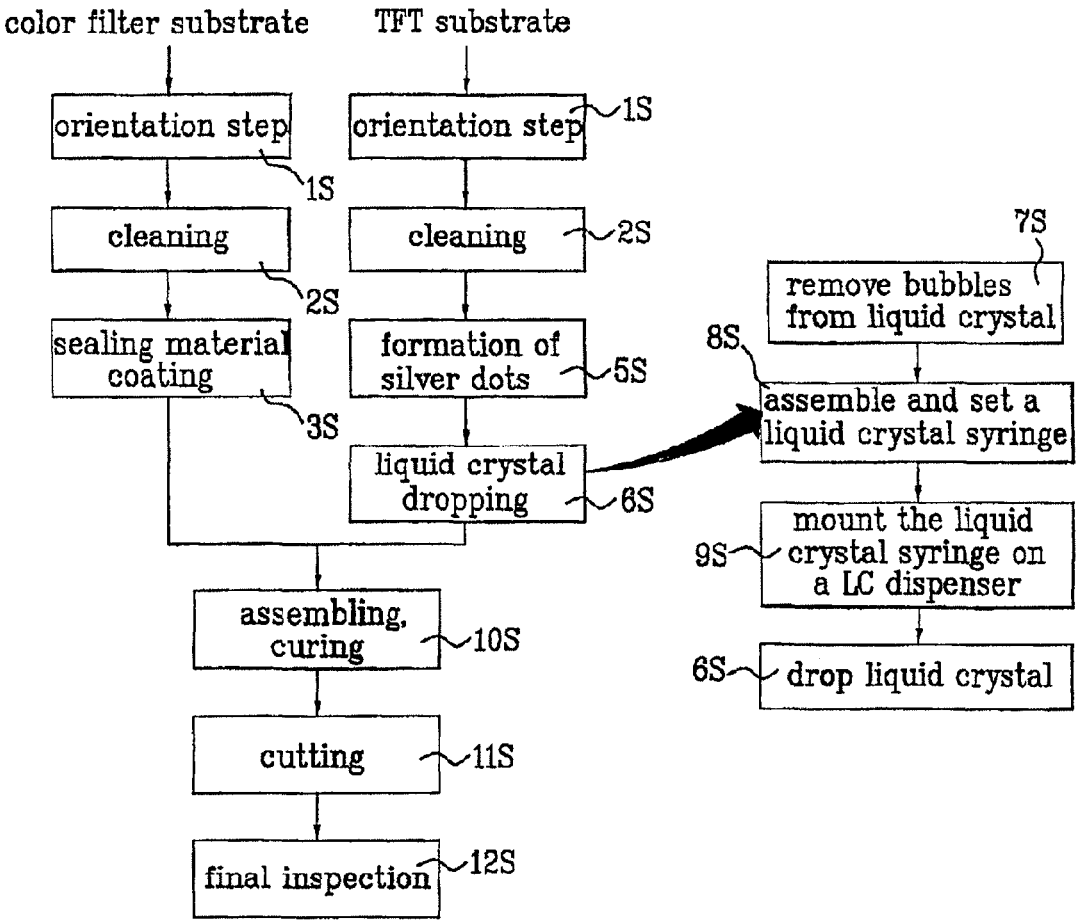
FIG.1 Related Art
FIG. 1 is a flow chart illustrating the steps of a method for manufacturing a liquid crystal display device using a related art liquid crystal dropping method.
Figure 2:
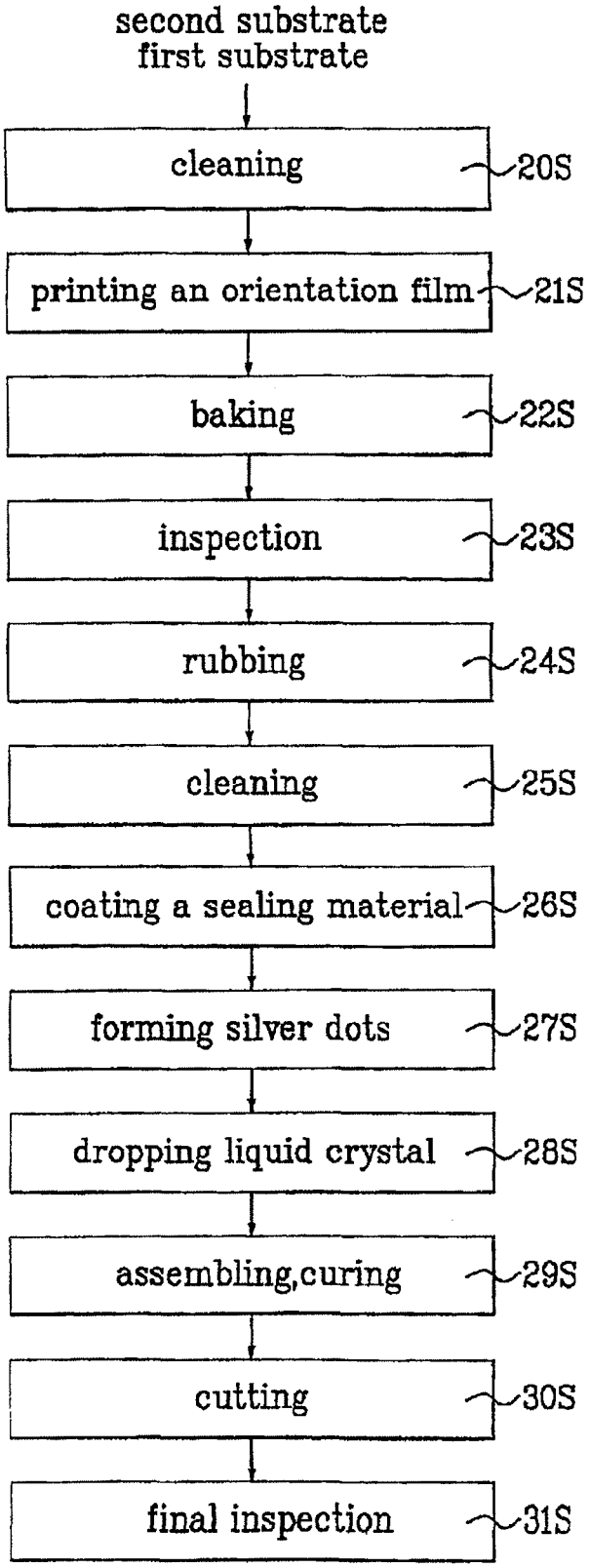
FIGS. 2-4 are flow charts each illustrating the steps of a method for manufacturing a liquid crystal display device in accordance with exemplary embodiments of the present invention.
Figure 3:
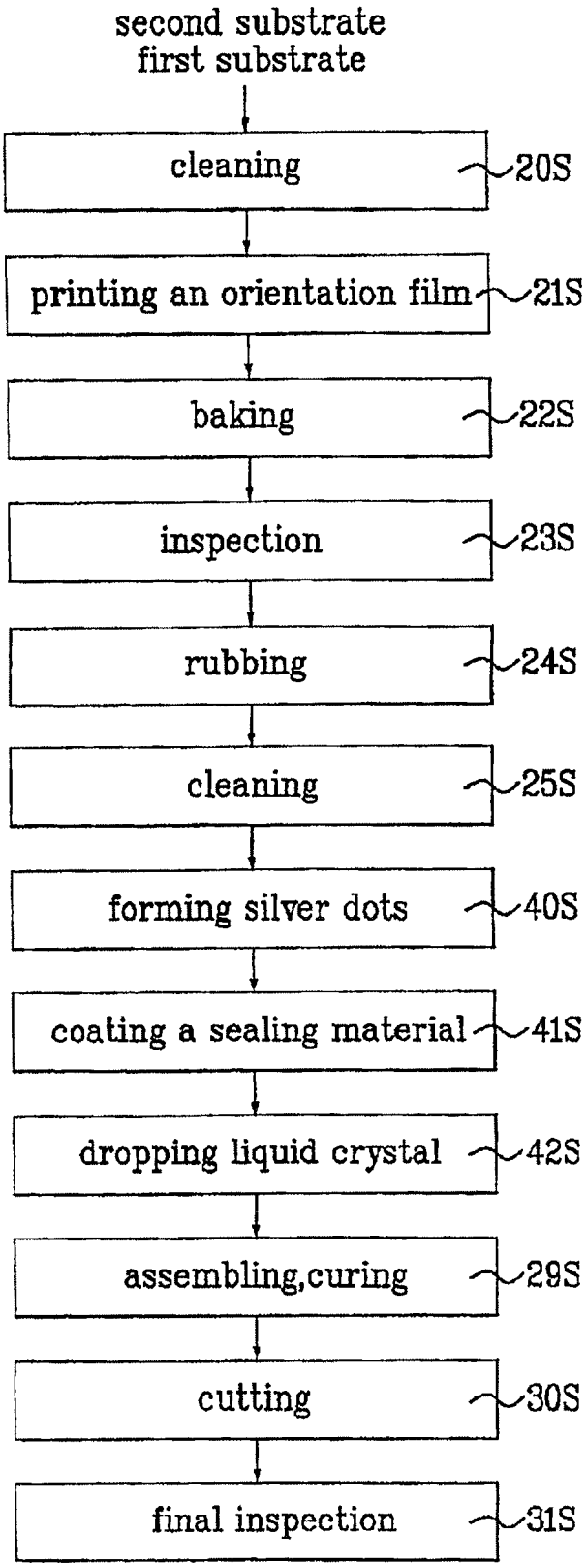
Figure 4:
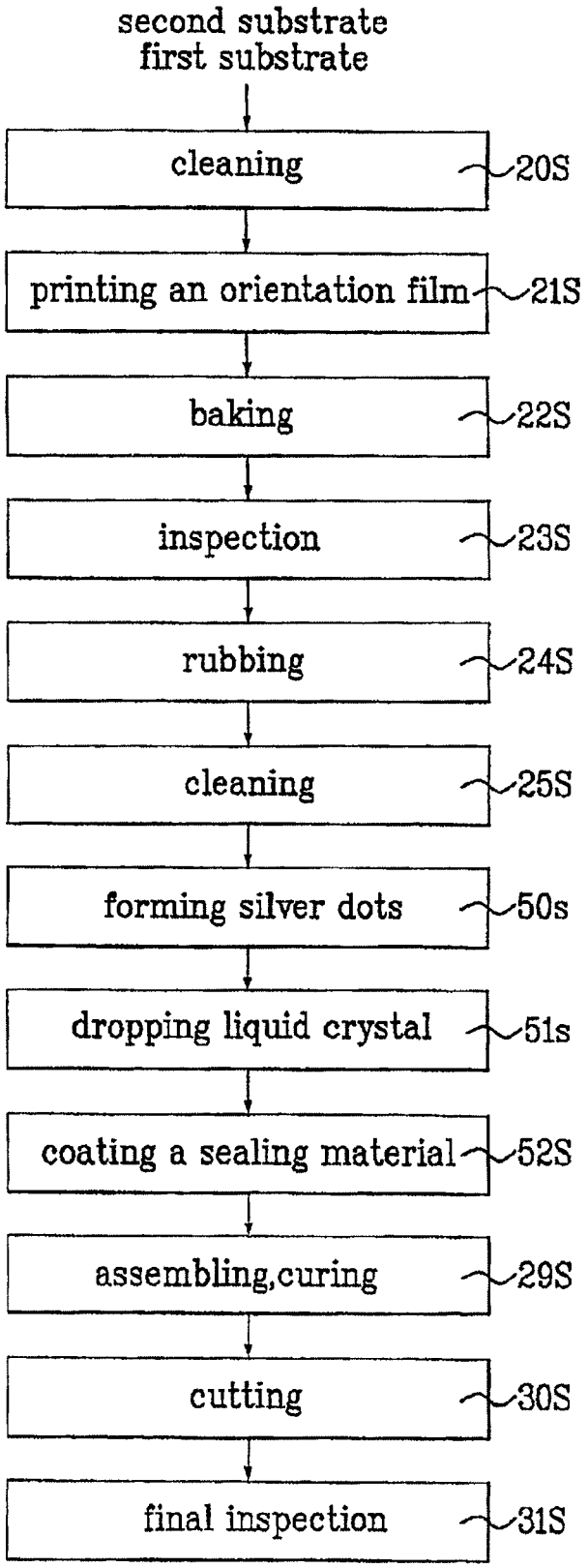

FIGS. 2-4 illustrate flow charts each showing the steps of a method for manufacturing a liquid crystal display in accordance with first, second, and third embodiments of the present invention.

Referring to FIG. 2, a first substrate and a second substrate are provided. The first substrate (hereafter referred to as a "TFT substrate") includes a plurality of gate lines running in one direction at fixed intervals, a plurality of data lines running in a direction perpendicular to the gate lines at fixed intervals, a plurality of thin film transistors, and pixel electrodes in a matrix pixel region defined by the gate lines and the data lines, formed thereon. The second substrate (hereafter referred to as a "color filter substrate") includes a black matrix layer for shielding a light incident to parts except the pixel region, a color filter layer, and a common electrode.

The TFT substrate and the color filter substrate are alternately provided into a production line having a single line structure for progressing the liquid crystal cell process. Processing equipment can be considered as equipment for the TFT substrate, equipment for the color filter substrate or both. The respective substrates are preferably provided to and processed by the corresponding equipment automatically in accordance with information on the substrates.

The liquid crystal cell process will now be explained in detail as follows.

An orientation step is carried out for both of the TFT substrate and the color filter substrate. The orientation step is progressed in an order of cleaning (20S) before coating the orientation film, printing of the orientation film (21S), baking of the orientation film (22S), inspecting of the orientation film (23S), and rubbing (24S).

After the TFT substrate and the color filter substrate that have passed through the orientation step are cleaned (25S), a sealing material is coated onto the color filter substrate, without providing an hole structure for liquid crystal injection so that the color filter substrate can later be assembled with the TFT substrate on a periphery of a pixel region with a fixed gap between the TFT substrate and the color filter substrate (26S). In contrast, the TFT substrate passes through the sealing material coating step (26S) without coating the sealing material and is provided into the next step.

Silver is coated on the TFT substrate in forms of dots for electrical connection with a common electrode on the color filter substrate (27S). However, the color filter substrate passes through the silver coating step (27S) without the silver coating and is provided into the next step.

Next, a step for dropping the liquid crystal onto the TFT substrate in a region corresponding to an area inside the sealing material coated on the color filter substrate is carried out (28S). Here, the color filter substrate passes through the liquid crystal dropping step (28S) without having the liquid crystal dropped thereon, and is provided into the next step.

Of course, it should be recognized that the present invention is not limited to this arrangement. For example, the coating of the sealing material, and the dropping of the liquid crystal material may carried out on either of the TFT substrate or the color filter substrate. The silver dot coating step may be omitted for the production of an IPS (In-Plane Switching) mode LCD in which both the pixel electrode and the common electrode are formed on a single TFT substrate.

Then, the TFT substrate and the color filter substrate are loaded into a vacuum chamber and assembled into a large panel (i.e., a panel having a plurality of LCD unit panels) such that the dropped liquid crystal is spread over the panels uniformly and the sealing material is cured (29S).

The large panel, having a TFT substrate and a color filter substrate with liquid crystal therebetween, is cut into individual unit panels (30S). Each individual unit panel is ground, and finally inspected (31S), thereby completing the manufacturing of an LCD device.

FIGS. 3 and 4 illustrate flow charts showing the steps of a method for manufacturing of a liquid crystal display in accordance with a second and third embodiments of the present invention, respectively, where the order of steps from the sealing material coating step (26S) to the liquid crystal dropping step (28S) in FIG. 2 are varied.

That is, referring to FIG. 3, after both the TFT substrate and the color filter substrate passed through the cleaning step (25S) of the orientation process, silver is coated on the TFT substrate in form of dots for electrical connection with a common electrode on the color filter substrate (40S). However, the color filter substrate passes through the silver coating step (40S) without the silver coating and is provided into the next step.

Next, a sealing material is coated on the color filter substrate without providing the liquid crystal filling hole so that the color filter substrate may later be assembled with the TFT substrate on a periphery of a pixel region with a fixed gap between the TFT substrate and the color filter substrate (41S). Here, the TFT substrate passes through the sealing material coating step (41S) without coating the sealing material thereon and is provided into the next step.

Next, a step for dropping the liquid crystal onto the TFT substrate in a region corresponding to an area inside the sealing material coated on the color filter substrate is carried out (42S). However, the color filter substrate passes through the dropping step without having the liquid crystal dropped thereon, and is provided into the next step.

Again, it should be recognized that the present invention is not limited to this arrangement. For example, the coating of the sealing material and the dropping of the liquid crystal may be carried out on either of the TFT substrate or the color filter substrate. The silver dot coating step may be omitted for the production of an IPS mode LCD in which the pixel electrode and the common electrode are formed on a single TFT substrate.

The remaining liquid crystal cell process is finished through the vacuum assembling step of the TFT substrate with the color filter substrate, the curing step of the sealing material (29S), cutting (30S), and final inspection (31S).

Referring to FIG. 4, after both the TFT substrate and the color filter substrate passed through the cleaning step (25S) of the orientation process, silver is coated on the TFT substrate in form of dots for electrical connection with a common electrode on the color filter substrate (50S). Here, the color filter substrate passes through the silver coating step without the silver coating and is provided into the next step.

Next, a step for dropping the liquid crystal onto the TFT substrate in a region corresponding to an area inside the sealing material coated on the color filter substrate is carried out (51S). Here, the color filter substrate passes through the liquid crystal dropping step without having the liquid crystal dropped thereon, and is provided into the next step.

Next, a sealing material is coated on the color filter substrate without providing a liquid crystal filling hole so that the color filter substrate may later be assembled with the TFT substrate on a periphery of a pixel region with a fixed gap between the TFT substrate and the color filter substrate (52S). However, the TFT substrate passes through the sealing material coating step (52S) without coating the sealing material thereon and is provided into the next step.

Again, it should be recognized that the present invention is not limited to the above arrangement. For example, the coating of the sealing material and the dropping of the liquid crystal may be carried out on either of the TFT substrate or the color filter substrate. The silver dot coating step may be omitted for the production of an IPS mode LCD in which the pixel electrode and the common electrode are formed on a single TFT substrate.

The remaining liquid crystal cell process is finished through the vacuum assembling step of the TFT substrate with the color filter substrate, the curing step of the sealing material (29S), cutting (30S), and final inspection (31S).

Also, it should be recognized that a particular step may be performed on one substrate at the same time that a different step is performed on the other substrate. That is, the production process line receives many thin film transistor substrates and color filter substrates in serial order. Each pair of substrates will pass through each component of the production process line. However, both substrates of each pair need not be disposed in the same component of the production process line at the same time. Thus, one substrate of the pair may be operated on by one component of the production process line at the same time that the other substrate of the pair is being operated on by another component.

As has been explained, the method for manufacturing a liquid crystal display in accordance with the present invention can improve spatial efficiency by adopting a single production line for the liquid crystal cell process, increase the productivity by providing an effective and simple liquid crystal cell process, and can overcome problems caused by a process time difference between the TFT substrate process line and the color filter substrate line. Here, management of respectively providing the TFT substrate and the color filter is simple. Meanwhile, though not shown, the silver dot forming (50S) in the third embodiment may be carried out at a step between the liquid crystal dropping (51S) and the sealing material coating (52S), or after the liquid crystal dropping (51S) and the sealing material coating (52S).

It will be apparent to those skilled in the art that various modifications and variations can be made in the method and apparatus for manufacturing a liquid crystal display of the present invention without departing from the spirit or scope of the invention. Thus, it is intended that the present invention cover the modifications and variations of this invention provided they come within the scope of the appended claims and their equivalents.

What is claimed is:

[1. A method for manufacturing a liquid crystal display device, comprising the steps of:

providing at least a first substrate and a second substrate on a single production process line;

passing the first and second substrates through a sealing material coating portion of the single production process line in serial order, a sealing material being coated on the second substrate with the first substrate being passed through the sealing material coating portion without forming a sealing material thereon;

passing the first and the second substrates through a liquid crystal dispensing portion of the single production process line in serial order, liquid crystal being dispensed onto a pixel region of one of the first and second substrates with the other one of the first and second substrates being passed through the liquid crystal dispensing portion without dispensing liquid crystal thereon; and assembling the first substrate with the second substrate to form a liquid crystal panel of at least one liquid crystal display device.]

[2. The method according to claim 1, wherein the sealing material coating portion is provided before the liquid crystal dispensing portion in the single production process line.]

[3. The method according to claim 1, wherein the liquid crystal dispensing portion is provided before the sealing material coating portion in the single production process line.]

[4. The method according to claim 1, wherein the liquid crystal is dispensed onto the first substrate.]

5. [The method according to claim 4,] *A method for manufacturing a liquid crystal display device, comprising the steps of:*

*providing at least a first substrate and a second substrate on a single production process line;*

*passing the first and second substrates through a sealing material coating portion of the single production process line in serial order, a sealing material being coated on the second substrate with the first substrate being passed through the sealing material coating portion without forming a sealing material thereon; passing the first and the second substrates through a liquid crystal dispensing portion of the single production process line in serial order, liquid crystal being dispensed onto a pixel region of one of the first and second substrates with the other one of the first and second substrates being passed through the liquid crystal dispensing portion without dispensing liquid crystal thereon; and*

*assembling the first substrate with the second substrate to form a liquid crystal panel of at least one liquid crystal display device;*

*wherein the liquid crystal is dispensed onto the first substrate;* wherein the first substrate is disposed in the liquid crystal dispensing portion and the liquid crystal is dispensed onto the first substrate at the same time that the second substrate is disposed in the sealing material coating portion.

6. The method according to claim 5, wherein the first substrate is a thin film transistor substrate and the second substrate is a color filter substrate.

7. The method according to claim 6, wherein the thin film transistor substrate includes:

a plurality of gate lines running in a first direction at substantially fixed intervals, a plurality of data lines running in a second direction substantially perpendicular to the gate lines at substantially fixed intervals, a plurality of thin film transistors and pixel electrodes in a matrix pixel region defined by the gate lines and the data lines, and an orientation film on the thin film transistors and the pixel electrodes.

8. The method according to claim 6, wherein the color filter substrate includes:

a black matrix layer, a color filter layer between the black matrix layer for displaying three colors of red, green, and blue, a common electrode to apply an electric field to the liquid crystal together with the pixel electrodes, and an orientation film on the common electrode.

[9. The method according to claim 1, wherein the liquid crystal is dispensed onto the first substrate, and wherein first substrate is a color filter substrate and the second substrate is a thin film transistor substrate.]

[10. The method according to claim 1, further comprising the step of cleaning the first substrate and the second substrate in serial order in a same cleaning unit.]

[11. The method according to claim 1, further comprising the step of cutting the liquid crystal panel into a plurality of unit liquid crystal panels to form a plurality of liquid crystal display devices.]

[12. The method according to claim 11, further comprising the step of inspecting defects of the unit liquid crystal panels.]

13. [The method according to claim 1.] *A method for manufacturing a liquid crystal display device, comprising the steps of:*

*providing at least a first substrate and a second substrate on a single production process line;*

*passing the first and second substrates through a sealing material coating portion of the single production process line in serial order, a sealing material being coated on the second substrate with the first substrate being passed through the sealing material coating portion without forming a sealing material thereon; passing the first and the second substrates through a liquid crystal dispensing portion of the single production process line in serial order, liquid crystal being dispensed onto a pixel region of one of the first and second substrates with the other one of the first and second substrates being passed through the liquid crystal dispensing portion without dispensing liquid crystal thereon; and*

*assembling the first substrate with the second substrate to form a liquid crystal panel of at least one liquid crystal display device;*

*the method* further comprising a step of passing the first and second substrates through a silver dot forming portion of the single production process line in serial order, silver dots being formed on the first substrate with the second substrate being passed without forming silver dots thereon.

14. An apparatus for manufacturing a liquid crystal display device having first and second substrates, comprising:

a sealing coating portion *including a seal dispenser* disposed to receive the first and second substrates in serial order, the [sealing coating portion] *seal dispenser* forming a sealing material on the second substrate and passing the first substrate without forming a sealing material thereon;

a liquid crystal dispensing portion, in series with the sealing coating portion, *including a liquid crystal dispenser disposed* to receive the first and second substrates in serial order, the liquid crystal [dispensing portion] *dispenser* dispensing liquid crystal onto one of the first and second substrates and passing the other one of the first and second substrates without dispensing liquid crystal thereon; and an assembler operatively disposed after the sealing coating portion and the liquid crystal dispensing portion, the assembler receiving the first and second substrate and assembling the first substrate with the second substrate to form a liquid crystal panel of a liquid crystal display device.

15. The apparatus according to claim 14, wherein the sealing coating portion is operatively disposed before the liquid crystal dispensing portion.

16. The apparatus according to claim 14, wherein the liquid crystal dispensing portion is operatively disposed before the sealing coating portion.

17. The apparatus according to claim 14, wherein the liquid crystal [dispensing portion] *dispenser* dispenses liquid crystal onto the first substrate, and wherein the first substrate is a thin film transistor substrate and the second substrate is a color filter substrate.

18. The apparatus according to claim 17, wherein the first substrate is disposed in the liquid crystal dispensing portion at the same time that the second substrate is disposed in the sealing coating portion.

19. The apparatus according to claim 14, further comprising:

a rubbing unit to mechanically rub, in serial order, the first and second substrates to provide an orientation layer; and a cleaning unit to clean, in serial order, both the first and second substrates.

20. The apparatus according to claim 14, further comprising a cutting unit to cut the assembled first and second substrates into a plurality of unit liquid crystal panels.

[21. An apparatus for manufacturing a liquid crystal display device, comprising:

means for providing at least a first substrate and a second substrate on a single production process line;

means for passing the first and second substrates through a sealing material coating portion of the single production process line in serial order, a sealing material being coated on the second substrate with the first substrate being passed through the sealing material coating portion without forming a sealing material thereon;

means for passing the first and the second substrates through a liquid crystal dispensing portion of the single production process line in serial order, liquid crystal being dispensed onto a pixel region of one of the first and second substrates with the other one of the first and second substrates being passed through the liquid crystal dispensing portion without dispensing liquid crystal thereon; and means for assembling the first substrate with the second substrate to form a liquid crystal panel of a liquid crystal display device.]

*22. A method for manufacturing a liquid crystal display device, comprising the steps of:*

*providing at least a first substrate and a second substrate on a single production process line;*

*passing the first and second substrates through a sealing material coating portion of the single production process line in serial order, including passing the first and second substrates through a seal dispenser, a sealing material coating on the second substrate with the first substrate passing through the sealing material coating portion without forming a sealing material thereon;*

*passing the first and the second substrates through a liquid crystal dispensing portion of the single production process line in serial order, including passing the first and second substrates through a liquid crystal dispenser, liquid crystal dispensing onto a pixel region of one of the first and second substrates with the other one of the first*

*and second substrates passing through the liquid crystal dispensing portion without dispensing liquid crystal thereon; and*

*assembling the first substrate with the second substrate to form a liquid crystal panel of at least one liquid crystal display device.*

*23. The method according to claim 22, wherein the sealing material coating portion is provided before the liquid crystal dispensing portion in the single production process line.*

*24. The method according to claim 22, wherein the liquid crystal dispensing portion is provided before the sealing material coating portion in the single production process line.*

*25. The method according to claim 22, wherein the liquid crystal is dispensed onto the first substrate.*

*26. The method according to claim 25, wherein the first substrate is disposed in the liquid crystal dispensing portion and the liquid crystal is dispensed onto the first substrate at the same time that the second substrate is disposed in the sealing material coating portion.*

*27. The method according to claim 26, wherein the first substrate is a thin film transistor substrate and the second substrate is a color filter substrate.*

*28. The method according to claim 27, wherein the thin film transistor substrate includes:*

*a plurality of gate lines running in a first direction at substantially fixed intervals,*

*a plurality of data lines running in a second direction substantially perpendicular to the gate lines at substantially fixed intervals,*

*a plurality of thin film transistors and pixel electrodes in a matrix pixel region defined by the gate lines and the data lines, and*

*an orientation film on the thin film transistors and the pixel electrodes.*

*29. The method according to claim 27, wherein the thin film transistor substrate includes:*

*a plurality of gate lines running in a first direction at substantially fixed intervals,*

*a plurality of data lines running in a second direction substantially perpendicular to the gate lines at substantially fixed intervals,*

*a plurality of thin film transistors on the first substrate,*

*a pixel electrode and a common electrode on the first substrate, and*

*an orientation film on the thin film transistors and the pixel and common electrodes.*

*30. The method according to claim 29, wherein the color filter substrate includes:*

*a black matrix layer,*

*a color filter layer between the black matrix layer for displaying three colors of red, green, and blue, and*

*an orientation film on the color filter layer.*

*31. The method according to claim 27, wherein the color filter substrate includes:*

*a black matrix layer,*

*a color filter layer between the black matrix layer for displaying three colors of red, green, and blue,*

*a common electrode to apply an electric field to the liquid crystal together with the pixel electrodes, and*

*an orientation film on the common electrode.*

*32. The method according to claim 27, wherein the color filter substrate includes:*

*a black matrix layer,*

*a color filter layer between the black matrix layer for displaying three colors of red, green, and blue, and*

*an orientation film on the color filter layer.*

*33. The method according to claim 22, wherein the liquid crystal is dispensed onto the first substrate, and wherein first substrate is a color filter substrate and the second substrate is a thin film transistor substrate.*

*34. The method according to claim 22, further comprising a step of cleaning the first substrate and the second substrate in serial order in a same cleaning unit.*

*35. The method according to claim 22, further comprising a step of cutting the liquid crystal panel into a plurality of unit liquid crystal panels to form a plurality of liquid crystal display devices.*

*36. The method according to claim 35, further comprising a step of inspecting defects of the unit liquid crystal panels.*

*37. The method according to claim 22, further comprising a step of passing the first and second substrates through a silver dot forming portion of the single production process line in serial order, silver dots forming on the first substrate with the second substrate passing without forming silver dots thereon.*

*38. The method according to claim 22, further comprising passing the first and second substrates through each component of the single production process line.*

*39. The method according to claim 22, wherein the seal dispenser is distinct from the liquid crystal dispenser.*

*40. The method according to claim 22, wherein the seal dispenser does not overlap with the liquid crystal dispenser.*

* * * * *